(12) United States Patent
Kurachi et al.

(10) Patent No.: US 7,394,192 B2
(45) Date of Patent: Jul. 1, 2008

(54) ELECTRON-EMITTING SOURCE HAVING CARBON NANOTUBES

(75) Inventors: Hiroyuki Kurachi, Mie (JP); Sashiro Uemura, Mie (JP)

(73) Assignee: Noritake co., Ltd., Aichi (JP)

( * ) Notice: Subject to any disclaimer, the term of this patent is extended or adjusted under 35 U.S.C. 154(b) by 104 days.

(21) Appl. No.: 11/413,331

(22) Filed: Apr. 28, 2006

(65) Prior Publication Data

US 2007/0114905 A1    May 24, 2007

(30) Foreign Application Priority Data

May 13, 2005    (JP) .............................. 2005-141509

(51) Int. Cl.
*H01J 1/62* (2006.01)
*H01J 63/04* (2006.01)

(52) U.S. Cl. ........................................ 313/495; 313/310

(58) Field of Classification Search ......... 313/495–497, 313/306, 308–310, 351, 355
See application file for complete search history.

(56) References Cited

U.S. PATENT DOCUMENTS

2005/0032255 A1* 2/2005 Kitamura et al. .............. 438/20

2005/0275329 A1* 12/2005 Hiraki et al. ................. 313/310

FOREIGN PATENT DOCUMENTS

JP     2001-048512 A    2/2001

* cited by examiner

*Primary Examiner*—Karabi Guharay
*Assistant Examiner*—Bumsuk Won
(74) *Attorney, Agent, or Firm*—Blakely, Sokoloff, Taylor & Zafman LLP

(57) ABSTRACT

A method of manufacturing an electron-emitting source includes first to third steps. In the first step, a cathode structure made of a metal containing any one of ion, nickel, cobalt, and chromium is heated to a first temperature in a reaction furnace to which a carbon source gas has been introduced, to form a plurality of first carbon nanotubes on the cathode structure by chemical vapor deposition. In the second step, the metal serving as a material of the cathode structure is deposited on at least either one of the cathode structure and the plurality of first carbon nanotubes, to form a catalyst metal layer. In the third step, the cathode structure including the catalyst metal layer is heated to a second temperature higher than the first temperature in the reaction furnace to which the carbon source gas has been introduced, to form a plurality of second carbon nanotubes which are thinner than the first carbon nanotubes on the catalyst metal layer by chemical vapor deposition. An electron-emitting source is also disclosed.

5 Claims, 2 Drawing Sheets

ELECTRON-EMITTING SOURCE HAVING CARBON NANOTUBES

BACKGROUND OF THE INVENTION

The present invention relates to an electron-emitting source comprising a plurality of cylindrical carbon nanotubes which are formed by chemical vapor deposition on a substrate containing iron or the like, and a method of manufacturing the same.

A carbon nanotube comprises a completely graphitized cylinder having a diameter of about 4 nm to 50 nm and a length of about 1 μm to 10 μm. Examples of the carbon nanotube include one having a shape in which a single graphite layer (graphene) is closed cylindrically and one having a shape in which a plurality of graphenes are layered telescopically such that the respective graphenes are closed cylindrically to form a coaxial multilayered structure. The central portions of the cylindrical graphenes are hollow. The distal end portions of the graphenes may be closed, or broken and accordingly open.

It is expected that the carbon nanotube having such a specific shape may be applied to novel electronic materials and nanotechnology by utilizing its specific electronic physical properties. For example, the carbon nanotube can be used to form an emitter which emits electrons. When a strong electric field is applied to the surface of a solid, the potential barrier of the surface of the solid which confines electrons in the solid becomes low and thin. Consequently, the confined electrons are emitted outside the solid due to the tunnel effect. This phenomenon is so-called field emission.

In order to observe field emission, an electric field as strong as $10^7$ V/cm must be applied to the solid surface. As a scheme to implement this, a metal needle with a sharp point is used. When an electric field is applied by using such a needle, the electric field concentrates at the point of the sharp needle, and a necessary strong electric field is obtained. The carbon nanotube described above has a very sharp point with a radius of curvature on the nm order, and is chemically stable and mechanically tough, thus providing physical properties that are suitable as a field emission emitter material.

When the carbon nanotube having the characteristic feature as described above is to be used in an electron-emitting source in an FED (Field Emission Display) or the like, carbon nanotubes must be formed on a substrate having a large area. Carbon nanotube manufacturing methods include electric discharge in which two carbon electrodes are set apart from each other by about 1 mm to 2 mm in helium gas and DC arc discharge is caused, laser vapor deposition, and the like. With these manufacturing methods, however, the diameter and length of the carbon nanotube are difficult to adjust, and the yield of the carbon nanotube as the target cannot be increased very much. A large amount of amorphous carbon products other than carbon nanotubes are produced simultaneously. Thus, a purifying process is required, making the manufacture cumbersome.

In order to solve the above problems, as shown in Japanese Patent Laid-Open No. 2001-048512, a method has been proposed in which a catalyst metal layer is prepared on a substrate and, while the substrate is heated, carbon source gas is supplied onto the catalyst metal layer to grow a large number of carbon nanotubes from the catalyst metal layer. In the manufacture of the carbon nanotube according to this thermal chemical vapor deposition (CVD) method, the length and diameter of the carbon nanotube to be formed can be controlled depending on the type of the catalyst metal, the duration of growth, the type of the substrate, and the like.

When a carbon nanotube is to be used as an electron-emitting source, if a thinner carbon nanotube is used, electrons can be emitted with a lower voltage. For example, when a carbon nanotube is to be used as an electron-emitting source in an FED, if a thinner carbon nanotube is used, driving is enabled at a lower voltage. This is preferable in terms of power saving.

When a carbon nanotube is to be formed by CVD, a plurality of carbon nanotubes can be formed close to each other on a substrate. When the temperature of the substrate is set to a high temperature of 800° C. to 1,000° C., thin carbon nanotubes having diameters of about 10 nm can be formed. If, however, an electrode structure which forms a cathode is formed of a catalyst metal and carbon nanotubes are to be directly formed on the electrode structure made of the catalyst metal so that the carbon nanotubes can be used as an electron-emitting source, the following problems arise.

In the above arrangement, as the electrode structure surface (growth surface) where the carbon nanotubes grow is entirely made of the catalyst metal, the carbon nanotubes can grow at any portion of the growth surface. Therefore, when the carbon nanotubes are to be formed by CVD, they can readily grow from the growth surface thickly with no gaps among them. When a plurality of thin carbon nanotubes are to be formed by CVD, the plurality of carbon nanotubes that are adjacent to each other tend to come into contact with each other to form a bundle. Then, it is very difficult to form carbon nanotubes evenly on the entire region of the substrate. If the carbon nanotubes are not formed evenly, field emission tends to occur locally. Local field emission may break a carbon nanotube and, depending on the case, cause a chain reaction to break many carbon nanotubes.

It is known that, when the temperature of the substrate is set to a comparatively low temperature of about 600° C. to 700° C., even if the growth surface is entirely made of the catalyst metal, a plurality of carbon nanotubes are formed more evenly such that they will not easily form bundles. The carbon nanotubes formed in this manner, however, are comparatively thick with diameters of 40 nm, and require a higher driving voltage than thin carbon nanotubes. This is not preferable in terms of power saving.

SUMMARY OF THE INVENTION

It is an object of the present invention to provide an electron-emitting source comprising a plurality of thinner carbon nanotubes that are formed evenly.

In order to achieve the above object, according to the present invention, there is provided a method of manufacturing an electron-emitting source, comprising the first step of heating a cathode structure made of a metal containing any one of iron, nickel, cobalt, and chromium to a first temperature in a reaction furnace to which a carbon source gas has been introduced, to form a plurality of first carbon nanotubes on the cathode structure by chemical vapor deposition, the second step of depositing the metal serving as a material of the cathode structure on at least either one of the cathode structure and the plurality of first carbon nanotubes, to form a catalyst metal layer, and the third step of heating the cathode structure including the catalyst metal layer to a second temperature higher than the first temperature in the reaction furnace to which the carbon source gas has been introduced, to form a plurality of second carbon nanotubes thinner than the first carbon nanotubes on the catalyst metal layer by chemical vapor deposition.

DESCRIPTION OF THE PREFERRED EMBODIMENTS

Figure 1A:
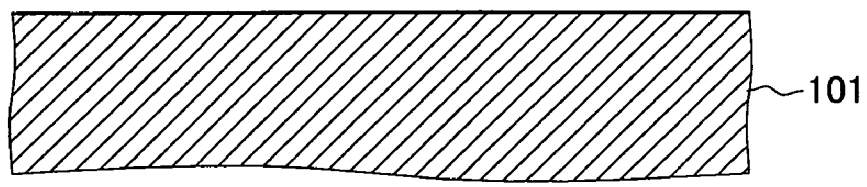
FIGS. 1A to 1D are views showing the steps in a method of manufacturing an electron-emitting source according to the first embodiment of the present invention.

An electron-emitting source according to the first embodiment of the present invention and a method of manufacturing the same will be described with reference to FIGS. 1A to 1D. First, as shown in FIG. 1A, a substrate (cathode structure) 101 which is made of stainless steel such as a 426 alloy and serves as a cathode is prepared. Subsequently, the substrate 101 is arranged in the process chamber (reaction path) of a CVD device formed of, e.g., a quartz pipe. While supplying carbon monoxide gas (source gas) and hydrogen gas (carrier gas) to the process chamber from one side, the substrate 101 is heated to about 650° C. In the process of this chemical vapor deposition, it suffices as far as the carbon monoxide gas is supplied at a flow rate of about 500 sccm and the hydrogen gas is supplied at a flow rate of about 1,000 sccm. Note that "sccm" is a unit of flow rate, and 1 sccm indicates that 1 $cm^3$ of a 0° C., 1-atm fluid flows within 1 min.

The supplied source gas thermally decomposes on the heated substrate 101 to generate carbon. The generated carbon dissolves in iron that forms the substrate 101. A large number of carbon nanotubes grow from the carbon-dissolved substrate 101. The source gas is not limited to carbon monoxide gas, but a hydrocarbon gas, e.g., acetylene, ethylene, methane, ethane, propylene, or propane, which contains one to three carbon atoms may be used. The material of the substrate 101 is not limited to stainless steel. It suffices as far as the substrate 101 is made of a material that contains such a catalyst metal that carbon nanotubes grow by chemical vapor deposition. As the catalyst metal, other than iron, nickel, cobalt, chromium, or the like can be used.

Figure 1B:
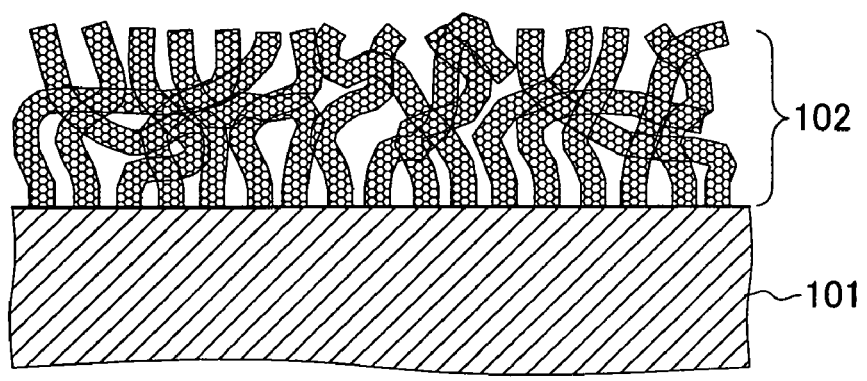

When growth of the carbon nanotubes is performed for about 30 min by the chemical vapor deposition described above, a carbon nanotube layer 102 comprising a large number of carbon nanotubes having diameters of about 30 nm to 40 nm is formed on the substrate 101, as shown in FIG. 1B. The grown carbon nanotubes form multilayer carbon nanotubes having lengths of about 15 μm. The large number of carbon nanotubes densely grow on the substrate 101 like fibers and are entangled with each other three-dimensionally to appear like cotton. The carbon nanotube layer 102 comprises the large number of carbon nanotubes having large diameters (about 40 nm) and has a uniform thickness so local field emission from it is suppressed.

Figure 1C:
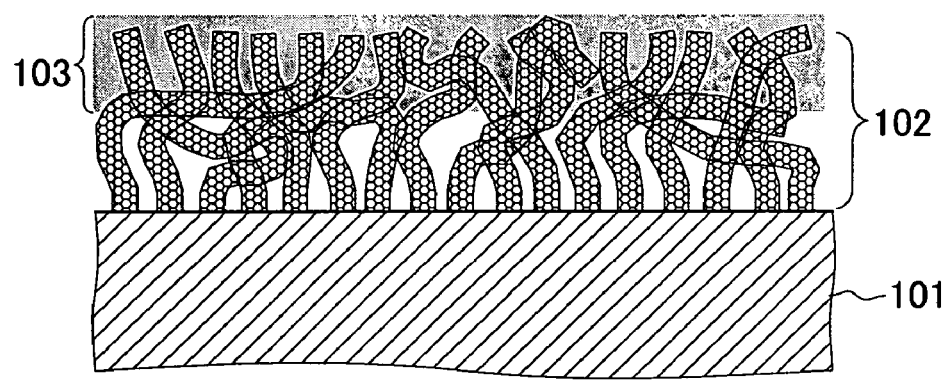

Subsequently, iron is deposited by vapor deposition or the like from above the carbon nanotube layer 102 formed on the substrate 101 to form a catalyst metal layer 103 in the upper layer of the carbon nanotube layer 102, as shown in FIG. 1C. When the substrate is flat, the catalyst metal layer 103 is formed to a thickness of about 1 nm. Formation of the catalyst metal layer 103 is not limited to vapor deposition, but another deposition method such as sputtering can employed.

Subsequently, the substrate 101 on which the catalyst metal layer 103 is formed is arranged (loaded) in the process chamber. While supplying carbon monoxide gas (source gas) and hydrogen gas (carrier gas) to the process chamber from one side, the substrate 101 is heated to about 800° C. to 1,000° C.

In the process of this chemical vapor deposition, it suffices as far as the carbon monoxide gas is supplied at a flow rate of about 500 sccm and the hydrogen gas is supplied at a flow rate of about 1,000 sccm. As the catalyst metal layer 103 is as thin as about 1 nm, when it is heated to be fused, it breaks up into a plurality of island portions dispersedly. Therefore, the carbon nanotubes that are to grow additionally are not formed close to each other but are formed dispersedly.

Figure 1D:
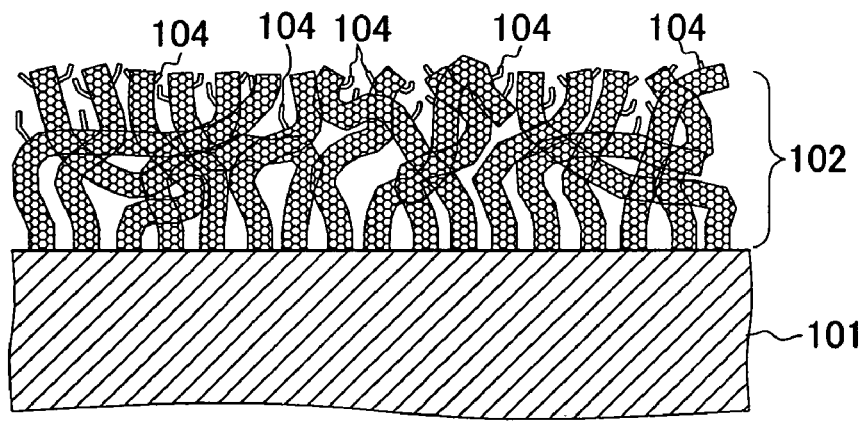

When growth of the carbon nanotubes is performed for about 4 min to 5 min by the chemical vapor deposition described above, a large number of carbon nanotubes 104 having diameters of about 10 nm grow dispersedly from the upper layer portion of the carbon nanotube layer 102, as shown in FIG. 1D. The lengths of the grown carbon nanotubes 104 are about 1 μm, which are shorter than those of the carbon nanotubes that constitute the carbon nanotube layer 102. As the carbon nanotubes 104 described above are formed within a short growth time, a carbon nanotube that is longer than the other carbon nanotubes will not locally form readily.

Hence, on the carbon nanotube layer 102 having a uniform thickness so local field emission is suppressed, a larger number of field emission ends are formed evenly. Due to the heating at 800° C. to 1,000° C. described above, the catalyst metal layer 103 breaks into a plurality of small island portions dispersedly. Thin carbon nanotubes can thus grow even with a temperature condition of about 650° C. If the growth temperature is higher, the carbon nanotubes to be formed will have better crystallinity.

After that, an anode electrode is arranged to oppose the substrate 101 so as to form an electron-emitting source. With the electron-emitting source formed in this manner, as the plurality of field emission ends formed in the upper layer of the carbon nanotube layer 102 comprise the thinner carbon nanotubes 104, field emission occurs at a lower voltage, thus largely decreasing the power consumption. The carbon nanotube layer 102 serving as the base is a uniform layer comprising the plurality of thick carbon nanotubes formed by CVD with a lower temperature condition. The carbon nanotube layer 102 does not include a portion where the thickness is different partly and field concentration tends to occur readily. Thus, stable field emission becomes possible.

In the above embodiment, the lengths of the carbon nanotubes 104 are set shorter than those of the carbon nanotubes that form the carbon nanotube layer 102. However, the present invention is not limited to this. Even when the carbon nanotubes 104 have almost the same or larger lengths, the same effect can be obtained.

The second embodiment of the present invention will be described with reference to FIGS. 2A to 2D. First, in FIG. 2A, a substrate 101 as in the first embodiment is subjected to a CVD process at about 650° C. following the same procedures as in FIG. 1A.

Figure 2A:
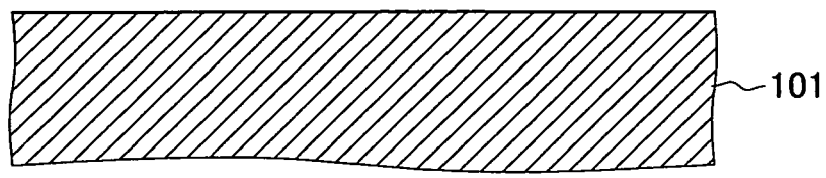
FIGS. 2A to 2D are views showing the steps in a method of manufacturing an electron-emitting source according to the second embodiment of the present invention.
Figure 2B:
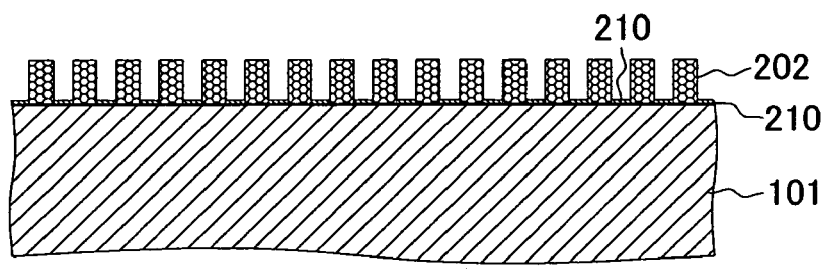

At this time, when growth of the carbon nanotubes is performed for about 2 min to 3 min by chemical vapor deposition, a large number of carbon nanotubes 202 having lengths of about 1 μm are formed on the substrate 101, as shown in FIG. 2B. The grown carbon nanotubes form multilayer carbon nanotubes having diameters of about 30 nm to 40 nm.

The large number of carbon nanotubes 202 are densely formed on the substrate 101 uniformly to be spaced apart from each other by about 10 nm. As the carbon nanotubes are formed short to have the lengths of about 1 μm, the carbon nanotubes 202 grow substantially in the direction of normal to the substrate 101. A thin (about several nm thick) carbon layer 210 is formed on the substrate 101 among the respective carbon nanotubes 202. When an electric field is applied in the direction of normal to the substrate 101, the carbon nanotubes 202 can be formed upright substantially vertically.

Figure 2C:
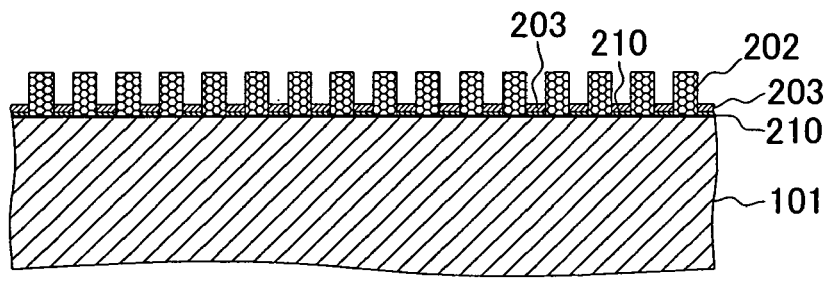
Figure 2D:
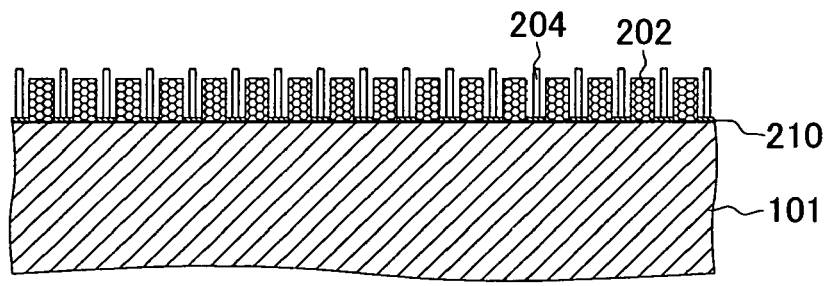

Subsequently, iron is deposited from above the plurality of carbon nanotubes 202 formed on the substrate 101 to form a catalyst metal layer 203 having a thickness of about 1 nm on the carbon layer 210 among the carbon nanotubes 202, as shown in FIG. 2C. As the respective carbon nanotubes 202 are short and directed vertically, deposition atoms flying from the deposition source readily reach the carbon layer 210 among the carbon nanotubes 202. Therefore, the catalyst metal layer 203 can be formed on the carbon layer 210 by vapor deposition. Formation of the catalyst metal layer 203 is not limited to vapor deposition, but another deposition method such as sputtering can be employed.

Subsequently, the substrate 101 on which the catalyst metal layer 203 is formed is arranged (loaded) in the process chamber. While supplying carbon monoxide gas (source gas) and hydrogen gas (carrier gas) to the process chamber from one side, the substrate 101 is heated to about 800° C. to 1,000° C. In the process of this chemical vapor deposition, it suffices as far as the carbon monoxide gas is supplied at a flow rate of about 500 sccm and the hydrogen gas is supplied at a flow rate of about 1,000 sccm. As the catalyst metal layer 203 is as thin as about 1 nm and formed on the carbon layer 210, when it is heated to be fused, it breaks up into a plurality of island portions (fine particles) dispersedly. As the catalyst metal layer 203 is formed among the thick carbon nanotubes 202 that have already been formed, the fine particles of the catalyst metal are arranged dispersedly at predetermined intervals.

When growth of the carbon nanotubes is performed by the chemical vapor deposition described above for about, e.g., 10 min to 15 min, thin carbon nanotubes 204 having diameters of about 10 nm grow from the substrate 101 dispersedly among the respective carbon nanotubes 202 to have lengths of about 4 μm to 5 μm. Accordingly, the upper ends of the carbon nanotubes 204 exceed the upper ends of the carbon nanotubes 202 and project from the layer of the carbon nanotubes 202. Although the catalyst metal layer 203 is not shown in FIG. 2D, it may partially remain on the carbon layer 210.

Each of the grown carbon nanotubes 204 has a single-layer structure in which a graphene is closed cylindrically. In the formation of the carbon nanotubes 204 described above, as the growth time is short, a carbon nanotube 204 that is longer than the other carbon nanotubes 204 will not locally form readily. As a result, the plurality of uniform-length carbon nanotubes 204 that allow suppression of local field emission can be obtained. Due to the presence of the carbon nanotubes 202, the plurality of carbon nanotubes 204 are suppressed from forming bundles.

After that, an anode electrode is arranged to oppose the substrate 101 to form an electron-emitting source. As the electron-emitting source formed in this manner comprises the large number of thinner (with diameters of 10 nm or less) carbon nanotubes 204, field emission occurs at a lower voltage, thus largely decreasing the power consumption. The carbon nanotubes 204 are respectively formed with uniform lengths at predetermined intervals. Thus, the carbon nanotube layer does not include a portion where the thickness is different partly and field concentration tends to occur readily. Thus, stable field emission becomes possible.

As has been described above, according to the present invention, thick carbon nanotubes are formed first, and after that thinner carbon nanotubes are formed. Thus, the plurality of thinner carbon nanotubes that are formed uniformly can form an electron-emitting source, which is an excellent effect.

What is claimed is:

1. An electron-emitting source comprising:
    a plurality of first carbon nanotubes which are formed on a cathode structure made of a metal containing any one of iron, nickel, cobalt, and chromium;
    a catalyst metal layer which is formed on said first carbon nanotubes and made of said metal that forms said cathode structure; and
    a plurality of second carbon nanotubes which are formed on said catalyst metal layer and are thinner than said first carbon nanotubes.

2. A source according to claim 1, wherein
    said catalyst metal layer is formed in an upper portion of said first carbon nanotubes, and
    said second carbon nanotubes are formed to grow from said upper portion of said first carbon nanotubes.

3. A source according to claim 1, wherein
    said catalyst metal layer are dispersedly formed into a plurality of island portions, and
    said second carbon nanotubes are formed on said catalyst metal layer which is formed dispersedly into said island portions.

4. An electron-emitting source comprising:
    a plurality of first carbon nanotubes which are formed on a cathode structure made of a metal containing any one of iron, nickel, cobalt, and chromium;
    a catalyst metal layer which is formed on said cathode structure and made of said metal that forms said cathode structure;
    a plurality of second carbon nanotubes which are formed on said catalyst metal layer of said cathode structure and are thinner than said first carbon nanotubes; and
    a carbon layer formed on said cathode structure among said first carbon nanotubes,
    wherein said catalyst metal layer is formed by depositing said metal serving as said material of said cathode structure on said carbon layer among said first carbon nanotubes, and
    said second carbon nanotubes are formed on said catalyst metal layer which is formed among said first carbon nanotubes.

5. A source according to claim 4, wherein said second carbon nanotubes are longer than said first carbon nanotubes.

* * * * *